United States Patent
Huang et al.

[11] Patent Number: 6,119,091
[45] Date of Patent: Sep. 12, 2000

[54] DVD AUDIO DECODER HAVING A DIRECT ACCESS PCM FIFO

[75] Inventors: Wen Huang, Sunnyvale; Arvind Patwardhan; Darren D. Neuman, both of San Jose, all of Calif.

[73] Assignee: LSI Logic Corporation, Milpitas, Calif.

[21] Appl. No.: 09/105,487

[22] Filed: Jun. 26, 1998

[51] Int. Cl.[7] .............................. H04B 1/66; H04B 15/00
[52] U.S. Cl. ..................... 704/500; 704/501; 704/502; 704/503; 704/504; 381/61; 381/119
[58] Field of Search .................... 704/500, 501, 704/502, 503, 504; 381/61, 119; 348/423; 84/603, 626, 662; 364/400.01; 375/372

[56] References Cited

U.S. PATENT DOCUMENTS

| | | | |
|---|---|---|---|
| 5,668,601 | 9/1997 | Okada et al. | 348/423 |
| 5,744,739 | 4/1998 | Jenkins | 84/603 |
| 5,761,537 | 6/1998 | Sturges et al. | 395/892 |
| 5,774,864 | 6/1998 | Han et al. | 704/500 |
| 5,781,184 | 7/1998 | Wasserman et al. | 345/202 |
| 5,792,971 | 8/1998 | Timis et al. | 84/609 |
| 5,804,754 | 9/1998 | Iwase et al. | 84/61 |
| 5,815,634 | 9/1998 | Daum et al. | 386/96 |
| 5,824,936 | 10/1998 | DuPuis et al. | 84/663 |
| 5,825,899 | 10/1998 | Yamaguchi et al. | 381/94.4 |

*Primary Examiner*—David R. Hudspeth
*Assistant Examiner*—Susan Wieland

[57] ABSTRACT

An audio decoder is described which supports simple sound-effect generation. The audio decoder includes a direct access pulse code modulation (PCM) first-in-first-out buffer (FIFO) to support simple sound effect generation. In one embodiment, the audio decoder additionally includes an input buffer, a decoding module, and an output interface. The input buffer buffers incoming data frames for the decoding module to retrieve and convert to a sequence of decoded audio samples. The FIFO is configured to receive and buffer audio sound effect samples from a control component external to the audio decoder. The output interface is configurable to retrieve decoded audio samples from the decoding module and audio sound effect samples from the FIFO. Any retrieved audio sound effect samples are included in a digital audio output signal provided by the output interface. The digital audio output signal may be provided directly to a digital-to-analog converter for sound reproduction. The availability of the FIFO for direct writing of audio samples by control components of the system provides desirable system features at negligible cost. A control component of the system is provided with the ability to easily generate test tones, to produce audio feedback to assist in user-control manipulation, and to support new system features such as alarm clocks and timers.

18 Claims, 5 Drawing Sheets

DVD AUDIO DECODER HAVING A DIRECT ACCESS PCM FIFO

This application is related to U.S. Patent application No. 09/105,490, filed Jun. 26, 1998 entitled "DVD Audio Decoder Having Efficient Deadlock Handling" by Wen Huang, and U.S. Patent application No. 09/105,969, filed Jun. 26, 1998 entitled "DVD Audio Decoder Having A Central Sync-Controller Architecture" by Wen Huang and Sophia Kao, both of which are filed concurrently herewith and incorporated by reference.

BACKGROUND OF THE INVENTION

1. Field of the Invention

This invention relates to the field of digital audio decoding, and in particular to a digital audio decoder that includes a direct access PCM FIFO which can be used to implement useful system features.

2. Description of the Related Art

Digital audio and video programs in initial sampled form and final playback form comprise an enormous amount of data, indeed so much that it would be prohibitively expensive to store or to secure the necessary bandwidth and power to transmit programs of moderate quality and length. To address this problem, compression techniques are commonly employed to reduce the amount of data by which the program is represented during storage and transmission, after which the program is reconstructed by some matched decompression method. To ensure compliance between transmitters and receivers of various manufacturers, several compression standards have been established. For audio compression, MUSICAM and Dolby AC-3 are popular. For multimedia (audio/video) compression, MPEG and DVD are popular.

These standards are not completely distinct and independent, e.g. DVD employs MPEG video compression techniques and allows for use of MUSICAM and AC-3 audio compression techniques. Although attention herein is directed primarily to the DVD standard, much of what is said is also applicable to systems operating according to other compression standards, and exclusion of such systems is not intended.

A compressed bitstream created in accordance with the DVD standard consists of interleaved substreams. Examples of substreams which may be included in a DVD bitstream include audio substreams, a video substream, sub-picture unit (SPU) substreams, and navigation substreams. Each substream consists of data packets having a packet header and a packet payload. The packet header includes identifying information specifying which substream the packet belongs to and where it belongs in that substream. The packet header also includes information specifying the payload type and size, and any compression parameters which may be required for decompression. Typically, audio data packets will be further divided into audio data frames, with each frame having a frame header and a frame payload.

To reconstruct the original data from the DVD bitstream, a DVD decoder locates the beginning of a packet, then reads the packet header to determine the substream membership. The decoder then routes the packet payload and portions of the packet header to the appropriate elementary bitstream buffer. Various modules of the decoder then operate on the contents of each buffer to reconstruct the associated program component (i.e. audio, video, SPU, navigation), and the reconstructed program component is finally presented to an appropriate output channel for delivery to the user.

The DVD standard provides for three audio substream formats: linear pulse code modulation (LPCM), MPEG, and Dolby AC3. Hence, an audio decoder which is DVD compliant must support decoding of at least three different audio formats. To minimize decoder cost and avoid unnecessary duplication of hardware, the structure of the audio decoder preferably employs component sharing techniques in which operations common to more than one format are carried out by a single component. The resulting structure is somewhat sophisticated and not particularly amenable to simple audio effects such as test tones or power-on beeps. It is therefore desirable to provide a means for supporting simple audio effects without unduly altering the audio decoder structure.

SUMMARY OF THE INVENTION

Accordingly, there is provided herein an audio decoder which includes a direct access pulse code modulation (PCM) first-in-first-out buffer (FIFO) to support simple sound effect generation. In one embodiment, the audio decoder includes an input buffer, a decoding module, a FIFO, and an output interface. The input buffer buffers incoming data packets for the decoding module to retrieve and convert to a sequence of decoded audio samples. The FIFO is configured to receive and buffer audio sound effect samples from a control component external to the audio decoder. The output interface is configurable to retrieve decoded audio samples from the decoding module and audio sound effect samples from the FIFO. Any retrieved audio sound effect samples are included in a digital audio output signal provided by the output interface. The digital audio output signal may be provided directly to a digital-to-analog converter for sound reproduction. The availability of the FIFO for direct writing of audio samples by control components of the system provides desirable system features at negligible cost. A control component of the system is provided with the ability to easily generate test tones, to produce audio feedback to assist in user-control manipulation, and to support new system features such as alarm clocks and timers.

BRIEF DESCRIPTION OF THE DRAWINGS

Other objects and advantages of the invention will become apparent upon reading the following detailed description and upon reference to the accompanying drawings in which:

FIG. 3 & 3-1 show a block diagram of a multimedia bitstream decoder,

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
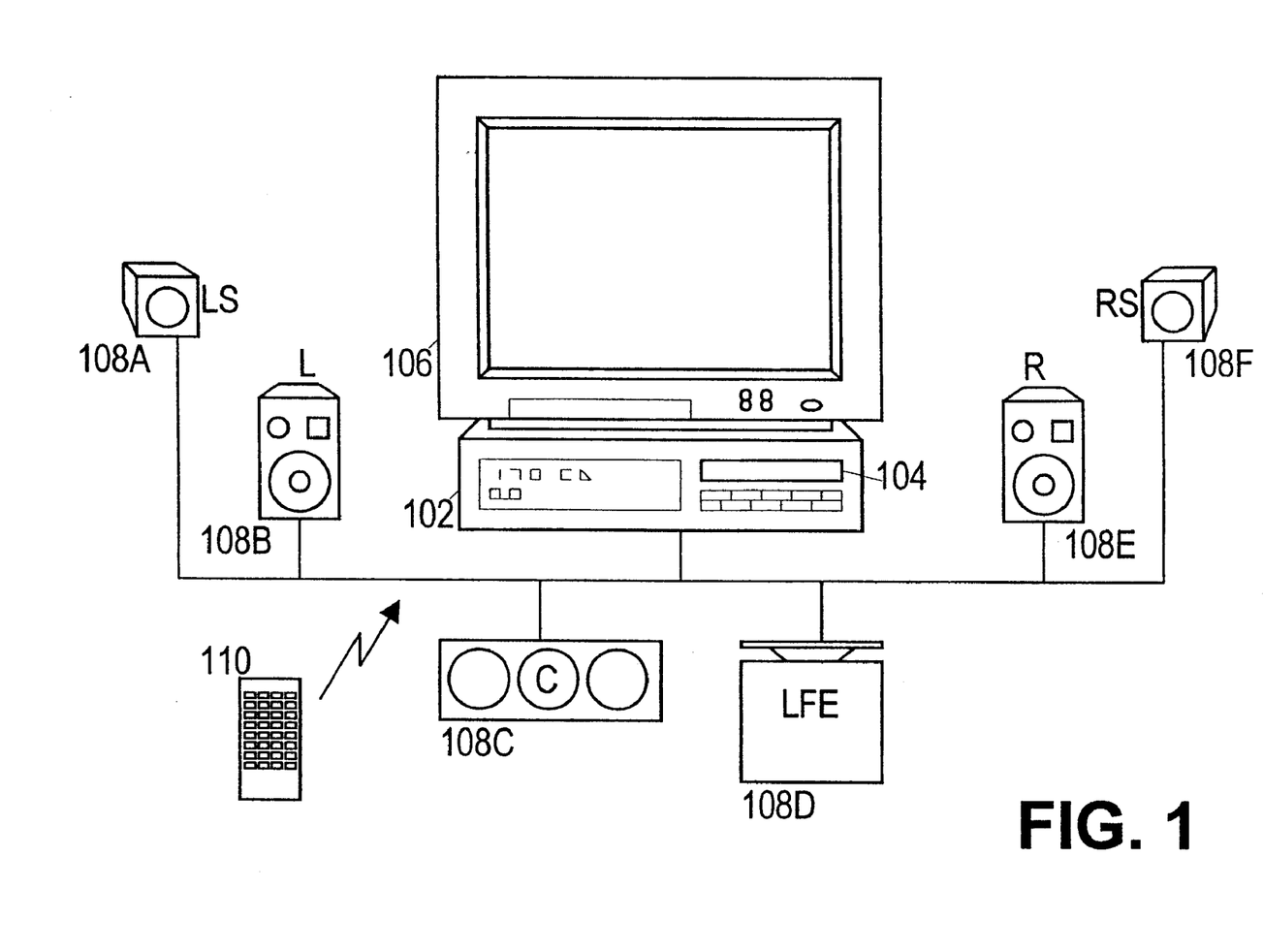
FIG. 1 shows a multimedia system which includes a multi-channel audio subsystem.

Turning now to the figures, FIG. 1 shows a video playback device 102 that includes a multimedia disc drive 104, is coupled to a display monitor 106 and a set of speakers 108, and which may be controlled via a remote control 110. Video playback device 102 includes an audio decoder which advantageously supports the generation of simple sound effects. The device 102 accepts multimedia discs in drive 104, and can read compressed multimedia bitstreams from the multimedia disc. The device 102 can convert the multimedia bitstreams into audio and video signals and present the video signal on display monitor 106 and the audio signals on speaker set 108.

In one embodiment, multimedia drive 104 is configured to accept a variety of optically readable disks. For example, audio compact disks, CD-ROMs, DVD disks, and DVD-RAM disks may be accepted. The drive 104 can consequently read audio programs and multimedia bitstreams. The drive 104 may also be configured to write multimedia bitstreams, and may additionally be configured to write audio programs. The drive 104 includes a multimedia decoder which converts read multimedia bitstreams into video displays and audio programs. The drive 104 may also include a multimedia encoder for converting video displays and audio programs into a multimedia bitstream. A user can instruct the device 102 to forward any received video displays and audio programs directly to the display monitor 106 and speaker set 108 for display and audio playback.

Figure 2:
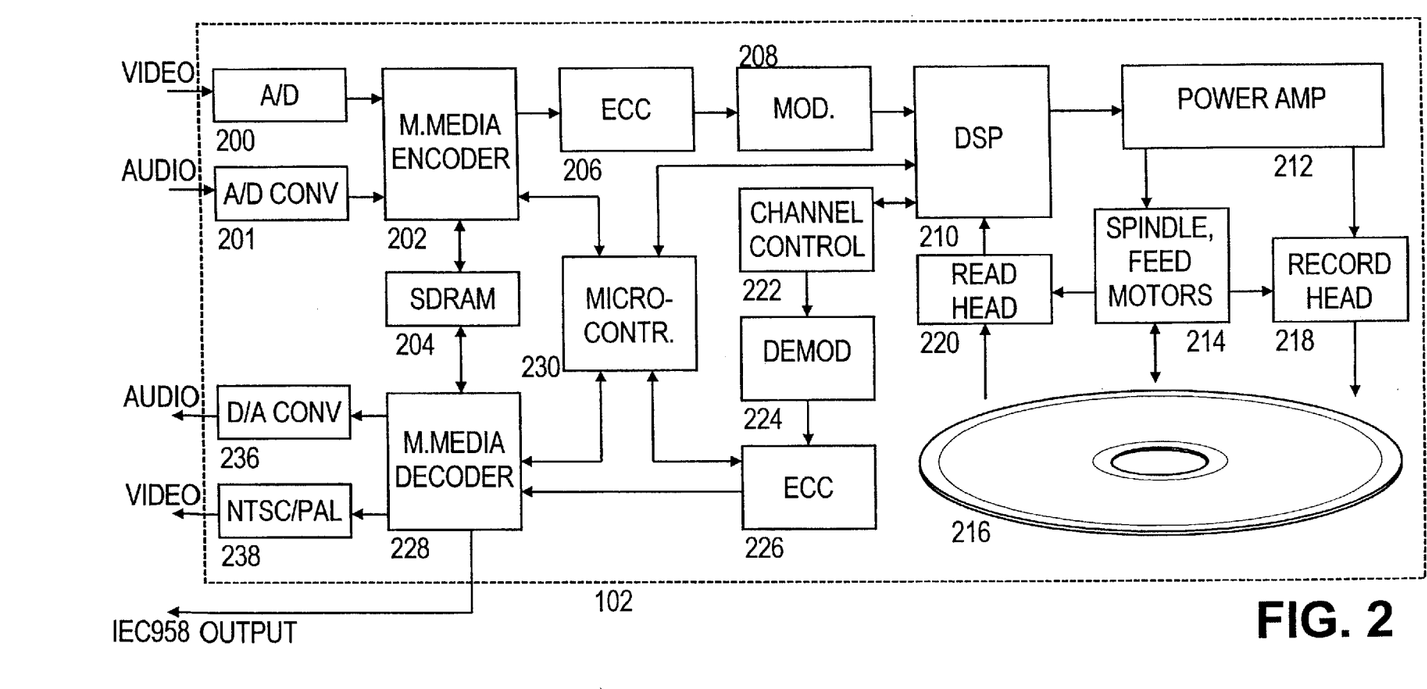
FIG. 2 shows a functional block diagram of a multimedia recording and playback device.

Turning now to FIG. 2, a fuinctional block diagram of one embodiment of a video recording and playback device 102 is shown. The device 102 provides audio and video signals to the display monitor 106, and may provide an IEC958-compliant digital audio bitstream to an external component. The device 102 can also accept audio and video signals from a television tuner or some other source. The received video and audio signals are converted to digital video and audio signals by A/D converters 200, 201. The digital audio and video bitstreams are provided to multimedia encoder 202. Multimedia encoder 202 uses synchronous dynamic random access memory (SDRAM) 204 as a frame store buffer while encoding the received signals. The resulting multimedia bitstream is processed by an error correction encoder 206 then converted to a modulated digital signal by modulator 208. The modulated digital signal is coupled to a digital signal processor (DSP) 210 and from there to a power amplifier 212. Amplified signals are coupled to drive motors 214 to spin a recordable multimedia disk 216, and to a record head 218 to store the modulated digital signal on the recordable multimedia disk 216.

Stored data can be read from the recordable multimedia disk 216 by read head 220 which sends a read signal to DSP 210 for filtering. The filtered signal is coupled to channel control buffer 222 for rate control, then demodulated by demodulator 224. An error correction code decoder 226 converts the demodulated signal into a multimedia bitstream which is then decoded by multimedia decoder 228. In decoding the multimedia bitstream, the multimedia decoder 228 produces digital audio and video bitstreams which are provided to D/A converters 236 and 238, which in turn provide the audio and video signals to display monitor 106. Video D/A 238 is typically an NTSC/PAL rasterizer for television, but may also be a RAMDAC for other types of video screens. Some of the various components are now described in greater detail.

Multimedia encoder 202 operates to provide compression of the digital audio and video signals. The digital signals are compressed individually to form bitstreams which are then divided into packets which are inter-mixed to form the compressed multimedia bitstream. Various compression schemes may be used, including MPEG and DVD.

In one embodiment, the general nature of the video compression performed by multimedia encoder 202 is MPEG encoding. The video compression may include sub-sampling of the luminance and chrominance signals, conversion to a different resolution, determination of frame compression types, compression of the frames, and re-ordering of the frame sequence. The frame compression may be intraframe compression or interframe compression. The intraframe compression is performed using a block discrete cosine transform with zigzag reordering of transform coefficients followed by run length and Huffinan encoding of the transform coefficients. The interframe compression is performed by additionally using motion estimation, predictive coding, and coefficient quantization.

In one embodiment, the general nature of the audio compression performed by multimedia encoder 202 is MPEG-2/AC-3 encoding. The audio compression may include locking the input sampling rate to the output bit rate, sample rate conversion, input filtering, transient detection, windowing, time-to-frequency domain transformation, channel coupling, rematrixing, exponent extraction, dithering, encoding of exponents, mantissa normalization, bit allocation, quantization of mantissas, and packing of audio frames, e.g. for AC-3 encoding. Similarly, the audio compression may include filter bank synthesis, calculation of signal to noise ratio, bit or noise allocation for audio samples, scale factor calculation, sample quantization, and formatting of the output bitstream, e.g. for MPEG-2 encoding. For either method, the audio compression may further include subsampling of low frequency signals, adaptation of frequency selectivity, and error correction coding.

In another embodiment, audio compression may not be employed, and the audio channels may be formatted as a linear pulse-code modulation (LPCM) bitstream. In this form, the audio signals are sampled at 48 or 96 kHz and the samples are packed into audio data frames and provided with a packet header to form audio substream packets.

Error correction encoder 206 and modulator 208 operate to provide channel coding and modulation for the output of the multimedia encoder 202. Error correction encoder 206 may be a Reed-Solomon block code encoder, which provides protection against errors in the read signal. The modulator 208 converts the error correction coded output into a modulated signal suitable for recording on multimedia disk 216.

DSP 210 serves multiple functions. It provides filtering operations for write and read signals, and it acts as a controller for the read/write components of the system. The modulated signal provided by modulator 208 provides an "ideal" which the read signal should approximate. In order to most closely approximate this ideal, certain nonlinear characteristics of the recording process must often be compensated. The DSP 210 may accomplish this compensation by pre-processing the modulated signal and/or postprocessing the read signal. The DSP 210 controls the drive motors 214 and the record head 218 via the power amplifier 212 to record the modulated signal on the multimedia disk 216. The DSP 210 also controls the drive motors 214 and uses the read head 220 to scan the multimedia disk 216 and produce a read signal.

The channel control buffer 222 provides buffering of the read signal, while demodulator 224 demodulates the read signal and error correction code decoder 226 decodes the demodulated signal. After decoding the demodulated signal, the error correction decoder 226 forwards the decoded signal to multimedia decoder 228.

Multimedia decoder 228 operates to decode the output of the error correction decoder 226 to produce digital audio signal and video signal, as well as an IEC958-formatted audio bitstream. The operation and structure of multimedia decoder 228 are discussed further below. The digital audio signal and video signal may be converted to analog audio and video signals before being sent to display monitor 106. The IEC958 bitstream may be provided directly to an external audio component.

Figure 3:
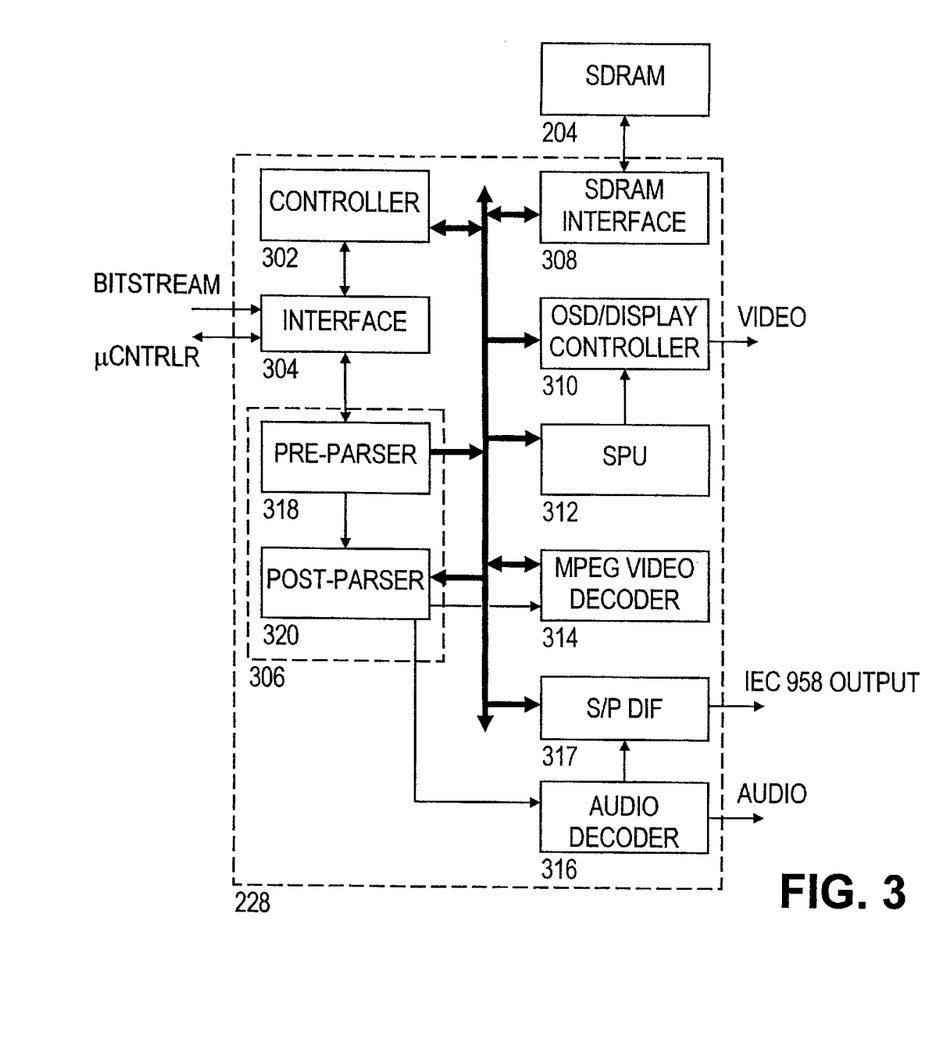
Figure 31:
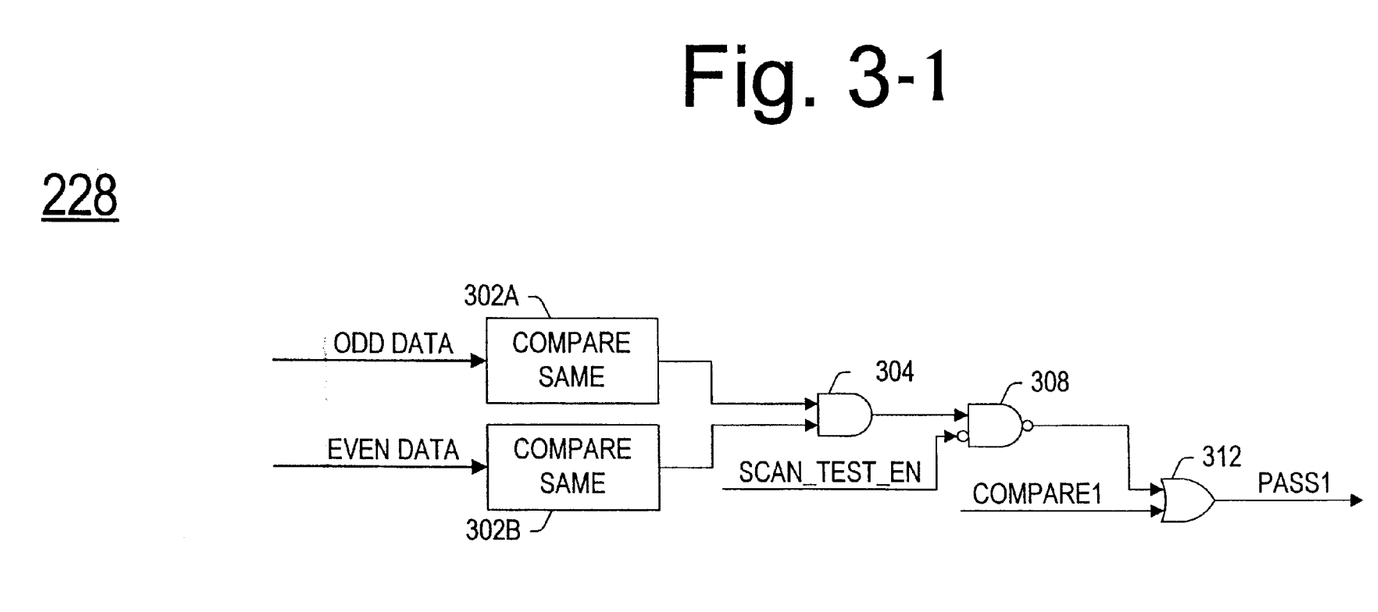

Turning now to FIG. 3, a block diagram of one embodiment of multimedia decoder 228 is shown. Multimedia decoder 228 comprises a controller 302, a host interface 304, a variable length decoder (VLD) 306, a memory interface 308, a display controller 310, a sub-picture unit (SPU) 312, an MPEG video decoder 314, an audio decoder 316, and a Sony/Philips Digital Interface (S/P DIF) 317. VLD 306 includes a pre-parser 318 and a post-parser 320. Controller 302 is coupled to the rest of the modules of multimedia decoder 228 to configure their behavior by setting various configuration registers and to monitor their performance. Controller 302 may also transmit status and request information to an external microcontroller 230. Host interface 304 is coupled to controller 302 and VLD 306, and is configured to receive an encoded multimedia bitstream and to communicate with an external microcontroller 230. Various operating instructions (e.g. reset, begin decode, playback mode) may be provided by external microcontroller 230 to controller 302 via host interface 304. Other operating instructions may be found in the encoded multimedia bitstream and provided to controller 302 (e.g. navigation commands).

VLD decoder 306 receives the encoded multimedia bitstream from host interface 304 and parses the encoded multimedia bitstream. Pre-parser 318 determines the substream membership of each data packet from the packet header and routes the packet contents (minus identifying fields from the packet header) to the appropriate elementary bitstream buffer in memory 204, where they wait on the availability of the associated module to begin being processed. Certain data packets (e.g. SPU substream, navigation substream) are retrieved directly from the appropriate buffer in memory 204 by the associated module. However, many of these data packets may have variable-length encoded data (e.g. compressed audio and video). These data packets are passed to the associated module via post-parser 320. Post-parser 320 may parse the bitstream syntax and perform elementary operations such as extracting the bit allocation and scaling information from the headers, and applying that information to convert the variable-length encoded data into fixed-length transform coefficients for subsequent modules to process.

Memory interface 308 acts as a bus arbiter and provides access to memory 204 for the other modules. Display controller 310 retrieves decoded digital video data from a buffer in memory 204 and provides it in raster order as a digital video output. Display controller 310 may incorporate an on-screen display (OSD) unit that can overlay system information on the video image, e.g. configuration menus, time, channel, volume, etc. Display controller 310 may also be coupled to overlay bitmap signals from other modules onto the video image. SPU controller 312 retrieves bitstream information from an SPU buffer in memory 204, decodes it into bitmap information, and provides the resulting bitmap to display controller 310 for possible display.

Video decoder 314 receives variable-length decoded transform coefficients from post-parser 320 and decodes them to generate decoded video data. The decoding process typically involves reference to anchor frames stored in frame buffers in memory 204. Video decoder 314 retrieves anchor frame data from the frame buffers and writes the decoded video data to anchor frame buffers or to intermediate buffers from which it is retrieved by display controller 310 for display.

Audio decoder 316 receives audio data from post-parser 320. Audio decoder 316 is configurable to parse the audio bitstream side information (BSI) from header fields and to convert transform coefficients into digital audio samples, and is further configurable to re-assemble LPCM audio data into digital audio samples. The digital audio samples are normally represented in PCM form. Additionally, the audio decoder 316 supports the generation of simple audio effects by controller 302 and/or external microcontroller 230.

S/P DIF 317 may be configured to retrieve audio data directly from the elementary audio bitstream buffer in memory 204, or may also be configured to receive audio data from audio decoder 316. and tracks the location of the next byte to be retrieved using an audio bypass buffer pointer. S/P DIF 317 formats the data into subframes, and transmits the formatted data to any external interface coupled to receive the IEC958 bitstream. The S/P DIF 317 is configured to maintain a loose synchronization with the audio decoder 316 to avoid introducing any undesired delays between reproduced audio signals.

Figure 4:
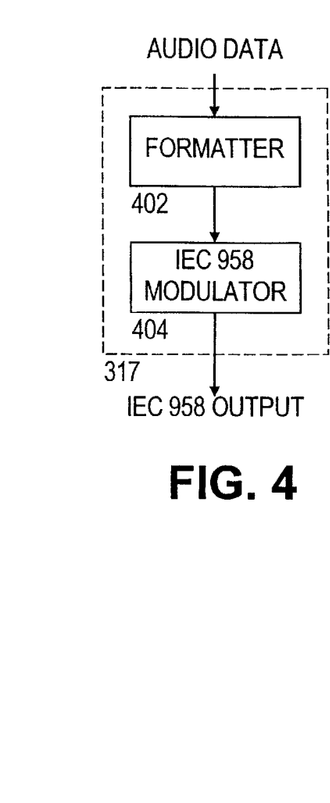
FIG. 4 shows a block diagram of a Sony/Philips Digital Interface.

FIG. 4 shows one embodiment of S/P DIF 317. S/P DIF 317 includes a data formatter 402 and an IEC 958 modulator 404. Formatter 402 is configured to format the received audio data into subframes for the modulator 404 to transmit. Modulator 404 is configured to convert subframes from formatter 402 into a serial, bi-phase coded, analog channel signal in accordance with the IEC 958 standard (IEC 958 First edition 1989-03: Digital audio interface) which is hereby incorporated by reference. Modulator 404 may include a input buffer for subframes provided from formatter 402.

The behavior of formatter 402 is dependent on the format of the received audio data. For compressed audio data, such as MPEG or AC3, a synchronization field is included at the beginning of each audio frame in the elementary bitstream buffer. The formatter 402 begins operation by locating this synchronization word. The formatter 402 then prepends four 16-bit words to the audio frame and appends zeros as necessary to provide the audio frame with a pre-determined length. The prepended words are denoted (in order) Pa, Pb, Pc, Pd. Pa and Pb are synchronization words, Pc identifies the compression standard for the audio frame, and Pd indicates the audio frame size. The enhanced audio frame is then taken 16 bits at a time and formatted into 32-bit subframes. The subframes each consist of a 4-bit synchronization preamble, four auxiliary bits, four zeros, 16 audio frame bits, and four subframe bits. The four subframe bits are validity (V), user (U), control (C) and parity (P). The use and meaning of the subfirame components is described further in the IEC 958 standard and the DVD standard.

For linear PCM audio data with 20- or 24-bit audio sample resolution, the formatter 402 reconstructs the audio samples from the audio frames in the bitstream buffer by appending nibbles or bytes to the most significant 16 bits. This is unnecessary for linear PCM audio frames with 16-bit sample resolutions or less, or for LPCM data being provided from the audio decoder 418. The audio samples may then be multiplied by a gain factor if the gain control is enabled. The formatter 402 then takes audio samples and formats them into 32-bit subframes consisting of a 4-bit synchronization preamble, the audio sample (zero extended in the least significant bits to 24 bits), and four subframe bits.

Figure 5:
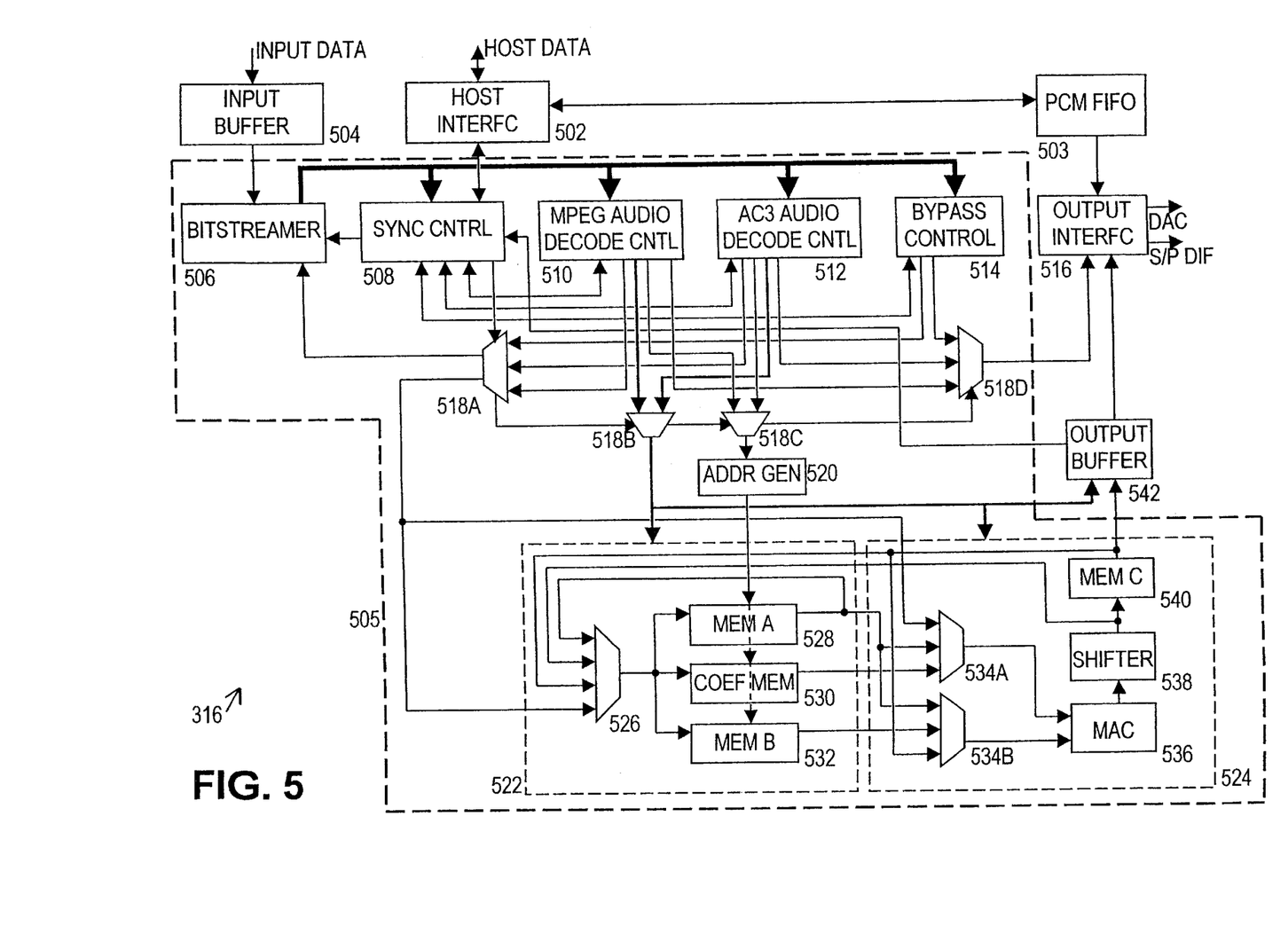
FIG. 5 shows a block diagram of an audio decoder.

FIG. 5 shows one embodiment of audio decoder 316 which supports simple sound effect generation. The audio decoder 316 comprises a host interface 502, a PCM FIFO 503, an input buffer 504, a decoding module 505, an output interface 516, and an output buffer 542. The decoding module may include a bitstreamer 506, a synchronization controller 508, an MPEG audio decode controller 510, an AC3 audio decode controller 512, a bypass controller 514, a set of controller multiplexers 518, an address generator 520, a memory module 522, and a data path module 524. The memory module 522 would include an input multiplexer 526, a first intermediate memory 528, a coefficient memory 530, and a second intermediate memory 532. The data path module would include input multiplexer pair 534, multiplier/accumulator 536, shifter 538, and output memory 540.

The host interface 502 couples to controller 302 to allow controller 302 to read status information from—and write information to—PCM FIFO 503 and sync controller 508. In one implementation of multimedia decoder 228, the host interface 502 is a sub-module of interface 304, and supports communication with external microcontroller 230. Either controller 302 or external microcontroller 230 can be configured to access PCM FIFO 503 to determine status information and to write digital output audio samples. The digital output audio samples are forwarded directly to output interface 516, which sends them to DAC 236 and S/P DIF 317 for audio reproduction. The PCM FIFO 503 may be configured to automatically assume priority over other digital output audio sample sources for output interface 516, and alternatively may be configured to be active only when certain configuration register flags are set. PCM FIFO status information, e.g. full, near full, near empty, and empty, may be visible as status bits in a host interface configuration register. One of the status signals, e.g. near full, may be driven externally by the host interface 502 as a service request signal to external microcontroller 230 or an external DMA controller. In one implementation, the PCM FIFO holds 8 stereo sample pairs with a 16-bit resolution. The audio samples are delivered to the output interface 516 in response to a sample request signal.

This audio decoder configuration allows simple sound effects to be generated by control components in a finished consumer product. This provides the system designer with an easy method for test-tone generation, power-on beep generation, audio feedback generation (i.e. key "clicks" in response to operation of controls, or error tones in response to invalid input), and alarm generation (e.g. for expiration of user-settable timers in the system). This versatility comes at extremely low cost and minimal impact on the operation of the audio decoding process. The operation of the other decoder components in an exemplary embodiment are now described.

The input buffer 504 is coupled to post-parser 320 to receive audio data from the elementary audio bitstream buffer in memory 204. Since the header fields have varng sizes and the audio data may be variablength encoded, the retrieval of information from buffer 504 is handled by bitstreamer 506. Bitstreamer 506 retrieves whole bytes from buffer 504 and provides whole shifted bytes as output to one of the controllers 508, 510, 512, 514. The shifted bytes are bit-shifted versions of the retrieved information from buffer 504; the shift amount is determined by an accumulation of token lengths as determined by the controllers. Bitstreamer 506 includes a concatenation register for concatenating adjacent bytes from buffer 504, and a shifter for shifting the concatenated bytes to determine a shifted byte. One of the controllers 508, 510, 512, 514 examines the shifted byte, identifies a token meaning and token size, and provides the token size to the bitstreamer 506 to allow the shifter to adjust the shift amount and provide the next byte of shifted information.

Sync controller 508 implements a state machine for parsing the audio data frame headers and extracting bitstream side information (BSI) such as audio data format, bit rate, and sampling frequency. The extracted BSI is used to set configuration registers for whichever controller 510, 512, 514 is used to handle the audio data in the audio data frame. The state machine implemented by sync controller 508 is written to accommodate the variations in header field format due to the various supported audio data formats. At the beginning of each audio data frame, the sync controller 508 is in control of the bitstreamer 506, and after the sync controller 508 finishes parsing the header information, it passes control of the bitstreamer 506 to a selected controller 510, 512, 514.

MPEG audio decode controller 510 and AC3 audio decode controller 512 each implement a state machine which carries out decoding of audio data compressed according to the corresponding standard. Bypass controller 514 operates to bypass the decoding process and to forward the information more-or-less directly from the bitstreamer 506 to the output buffer 542. A set of multiplexers 518 is controlled by sync controller 508 to determine which of the controllers 510, 512, 514 controls the processing of the audio data after any header fields have been parsed. Bitstreamer 506 control signals, data path input signals, and output interface control signals 516 are provided from each of the three controllers, and multiplexers 518A, 518D route the selected controllers signals to the associated components. Additionally, controllers 510, 512 provide memory module 522 and data path 524 control signals, and address generator 520 signals, and multiplexers 518B and 518C route the selected signals to the appropriate components.

Controllers 510, 512, and 514 determine a token size and meaning for each byte received from bitstreamer 506, and via multiplexer 518A, the selected controller provides the token meaning to memory module 522 and data path 524. According to control signals provided from the selected controller via multiplexer 518B, the memory module 522 and data path 524 operate to process the input values from multiplexer 518A. Ultimately in response to the control signals from the selected controller, data path 524 determines a sequence of digital output audio samples which are provided to output buffer 542, from which they are retrieved by output interface 516 and provided to a digital-to-analog converter (DAC) and/or S/P DIF 317 in response to an audio sample request clock signals.

Input multiplexer 526 steers data from various input sources to intermediate memories 528, 532 and to a read-only memory 530 The input sources include multiplexer 518A, one of the intermediate memories 528, and data path 524. The control signals from multiplexer 518B determine which input source is selected, which memory is triggered to receive the input data, and which memories are configured to provide read data to data path 524. The memories 528, 530, 532 are configured to receive addresses from address generator 520 for storing input data or reading stored data. Read-only memory 530 may also be configured to use the input data as a read address. Address generator 520 may include a look-up table, counter, and/or additional logic to simplify the implementation of the state machines in controllers 510, 512 for carrying out the decoding algorithms.

Data path 524 includes a multiplexer pair 534A, 534B for selecting input factors to multiplier/accumulator 536. The selected input factor from multiplexer 534A may be from multiplexer 518A, intermediate memory 528, or coefficient memory 530. The selected input factor from multiplexer 536B may be from either of the intermediate memories 528, 532, or from the output of data path 524. The factors are multiplied by multiplier/accumulator 536 and a sequence of products may be summed in accordance with control signals from multiplexer 518B. The output of multiplier/accumulator 536 may be shifted 538 and buffered in intermediate buffer 540, again in accordance with the control signals. The configuration of address generator 520, memory module 522, and data path 524 provides for the ability to carry out a wide variety of algorithms in one or more ways. The state machines implemented in controllers 510, 512, 514 provide the control signals necessary to direct the execution of the algorithms to produce decoded audio sample sequences and buffer them in output buffer 542. Output interface 516 receives a sample-request clock and responsively retrieves and provides digital audio samples from the output buffer. In one embodiment, the output samples are provided simultaneously to both the DAC and the S/P DIF.

Numerous variations and modifications will become apparent to those skilled in the art once the above disclosure is fully appreciated. It is intended that the following claims be interpreted to embrace all such variations and modifications.

What is claimed is:

1. An audio decoder which supports generation of simple sound effects, wherein the audio decoder comprises:

an input buffer configured to receive and buffer audio data frames;

a decoding module coupled to retrieve the audio data frames from the input buffer and configured to convert the audio data frames into a sequence of decoded audio samples;

a first-in first-out buffer (FIFO) configured to receive sound effect audio samples generated by an external control component;

a host interface coupled to the external control component to receive the sound effect samples and to receive decoding module configuration information, wherein the host interface is coupled to provide the sound effect samples to the FIFO, and coupled to provide the configuration information to the decoding module; and an output interface coupled to retrieve decoded audio samples from the decoding module and sound effect audio samples from the FIFO in response to an audio sample request clock, wherein the output interface is configurable to provide the retrieved sound effect audio samples to a digital-to-analog converter for conversion to an analog audio signal.

2. The audio decoder of claim 1, wherein the decoding module is configured to decompress compressed audio data from audio data frames.

3. The audio decoder of claim 1, wherein the FIFO is configured to determine a status signal indicative of a number of sound effect samples residing in the FIFO, and is further configured to provide the status signal to the host interface.

4. The audio decoder of claim 3, wherein the host interface is configured to provide the status signal to the external control component as a service request signal, wherein the service request signal is asserted if the number of sound effect samples residing in the FIFO falls below a predetermined threshold.

5. The audio decoder of claim 1, further comprising an output buffer coupled between the decoding module and the output interface, wherein the output buffer is configured to buffer decoded audio samples until the decoded audio samples are retrieved by the output interface.

6. A method for producing simple sound effects through an audio decoder configured to decode compressed audio data frames into a sequence of decoded audio samples and to provide the decoded audio samples to a digital-to-analog converter for sound reproduction, wherein the method comprises:

generating a sequence of audio sound effect samples in response to a system event;

writing the sequence of audio sound effect samples to a FIFO in the audio decoder;

retrieving the audio sound effect samples from the FIFO in response to a sample request clock; and providing the retrieved sound effect samples to the digital-to-analog converter for sound reproduction.

7. The method of claim 6, further comprising:

monitoring a FIFO status signal to determine when more audio sound effect samples are receivable; and providing more audio sound effect samples if the FIFO status signal is asserted.

8. The method of claim 6, further comprising:

configuring an output interface to retrieve the audio sound effect samples from the FIFO after the writing of some audio sound effect samples; and reconfiguring the output interface to retrieve decoded audio samples after the sequence of audio sound effect samples has been provided to the digital-to-analog converter.

9. A multimedia decoder which supports generation of simple sound effects by a control component, wherein the multimedia decoder includes:

an interface configured to receive a multimedia bitstream;

a pre-parser coupled to the interface to receive the multimedia bitstream and configured to extract an audio bitstream and a video bitstream from the multimedia bitstream;

a memory configured to include an audio bitstream buffer and a video bitstream buffer, wherein the pre-parser is configured to provide the audio bitstream and the video bitstream to their respective buffers;

a video decoder configured to receive the video bitstream and to convert the video bitstream into a sequence of video frames;

a display controller configured to retrieve the sequence of video frames and convert each video frame into a digital video signal;

an audio decoder configured to receive the audio bitstream and to convert the audio bitstream into a sequence of digital audio samples, wherein the audio decoder includes:

an output interface configured to retrieve the sequence of digital audio samples in response to a sample request clock, and to provide the digital audio samples as a digital audio output signal;

a FIFO configured to buffer sound effect samples provided by a control component and coupled to provide the sound effect samples to the output interface, wherein the output interface is configurable to include the sound effect samples in the digital audio output signal; and a host interface coupled to the control component to receive the sound effect samples and to receive audio decoder configuration information, wherein the host interface is coupled to provide the sound effect samples to the FIFO, and configured to set parameters for the conversion of the audio bitstream into digital audio samples.

10. The multimedia decoder of claim 9, wherein the control component is included in the multimedia decoder and is configured to initiate operation of the pre-parser, the video decoder, the display controller, and the audio decoder.

11. The multimedia decoder of claim 9, wherein the control component provides the sound effect samples to the FIFO in response to detecting a system event.

12. The multimedia decoder of claim 11, wherein the system event is part of a power-up sequence.

13. The multimedia decoder of claim 11, wherein the system event is a test-tone enablement.

14. The multimedia decoder of claim 11, wherein the system event is a user-control manipulation.

15. The multimedia decoder of claim 11, wherein the control component includes a real-time clock and a user-settable alarm time register, and wherein the system event is the progression of the real-time clock past the alarm time.

16. The multimedia decoder of claim 9, further comprising a post-parser configured to retrieve the audio bitstream from the audio bitstream buffer and to provide the audio bitstream to an input buffer in the audio decoder.

17. The multimedia decoder of claim 16, wherein the audio decoder further includes a decoding module configured to retrieve the audio bitstream from the input buffer and to convert the audio bitstream into the sequence of digital audio samples according to the parameters set by the host interface.

18. The multimedia decoder of claim 17, wherein the audio decoder further comprises an output buffer configured to buffer the sequence of digital audio samples, wherein the output interface is configured to retrieve the digital audio samples from the output buffer in response to the sample request clock.

* * * * *

UNITED STATES PATENT AND TRADEMARK OFFICE
CERTIFICATE OF CORRECTION

| | |
|---|---|
| PATENT NO. | : 6,119,091 |
| APPLICATION NO. | : 09/105487 |
| DATED | : September 12, 2000 |
| INVENTOR(S) | : Wen Huang et al. |

It is certified that error appears in the above-identified patent and that said Letters Patent is hereby corrected as shown below:

Column 10, claim 6, line 20, add "directly" after "samples".

Signed and Sealed this

Sixth Day of July, 2010

David J. Kappos
*Director of the United States Patent and Trademark Office*